United States Patent [19]
Tobita et al.

[11] Patent Number: 5,012,314
[45] Date of Patent: Apr. 30, 1991

[54] LIQUID CRYSTAL DISPLAY RESTORING APPARATUS

[75] Inventors: Toshio Tobita; Shigeru Yachi; Eishi Gofuku, all of Amagasaki, Japan

[73] Assignee: Mitsubishi Denki Kabushiki Kaisha, Japan

[21] Appl. No.: 501,858

[22] Filed: Mar. 30, 1990

[30] Foreign Application Priority Data

Mar. 31, 1989 [JP] Japan .................................. 1-83275

[51] Int. Cl.⁵ .................... H01L 29/78; H01L 21/265; G09G 3/20; G02F 1/13
[52] U.S. Cl. ................................ 357/23.12; 357/23.7; 340/767; 340/793; 350/351; 437/45
[58] Field of Search ............... 350/351; 340/793, 767; 437/173, 174, 45; 357/23.7, 23.12

[56] References Cited

U.S. PATENT DOCUMENTS

| | | | |
|---|---|---|---|
| 4,181,538 | 1/1980 | Narayan et al. | 437/174 X |
| 4,379,292 | 4/1983 | Minato et al. | 340/703 |
| 4,675,467 | 6/1987 | Van Dine et al. | 437/173 X |
| 4,701,422 | 10/1987 | Elliott | 437/45 X |
| 4,727,044 | 2/1988 | Yamazaki | 437/45 |
| 4,764,485 | 9/1988 | Loughran et al. | 437/173 X |
| 4,783,421 | 11/1988 | Carlson et al. | 437/173 X |
| 4,823,180 | 4/1989 | Wieder et al. | 357/23.7 X |
| 4,888,305 | 12/1989 | Yamazaki et al. | 437/174 X |
| 4,912,066 | 3/1990 | Wills | 437/174 X |

OTHER PUBLICATIONS

Kaneko et al., "Reliability of . . . Transistors", Central Research Laboratory, Hitachi, Ltd., 1987, pp. 12-15.

Primary Examiner—Stanley D. Miller
Assistant Examiner—Ron Trice
Attorney, Agent, or Firm—Leydig, Voit & Mayer

[57] ABSTRACT

An apparatus for restoring a liquid crystal display element having a thin film transistor with a threshold voltage and controlling the brightness of the element includes a display driver for driving the liquid crystal display element, a picture image inspection apparatus for evaluating the brightness of the liquid crystal display element, and a thin film transistor threshold voltage adjusting device including a light source for adjusting the threshold voltage of the thin film transistor by irradiating the thin film transistor with light in response to the brightness evaluation.

10 Claims, 9 Drawing Sheets

LIQUID CRYSTAL DISPLAY RESTORING APPARATUS

FIELD OF THE INVENTION

The present invention relates to a liquid crystal display restoring apparatus and, more particularly, to an apparatus for repairing threshold voltage defects in a liquid crystal display which has a thin film transistor for controlling the display state of each pixel.

BACKGROUND OF THE INVENTION

FIG. 2 shows a cross-sectional view of a liquid crystal display having a thin film transistor for controlling the display state of each pixel. In FIG. 2, reference numeral 1 designates a liquid crystal display comprising a plurality of pixels and reference numeral 10 designates a thin film transistor produced on the rear substrate 100 of the liquid crystal display 1. Reference numeral 200 designates a transparent front substrate and 210 is a color filter disposed at the internal surface of the substrate 200. Reference numeral 220 designates a transparent electrode mounted on the color filter 210. Reference numeral 300 designates a seal disposed between the two opposed substrates 100 and 200. Reference numeral 400 designates liquid crystal material between the substrates 100 and 200.

FIG. 3 shows a cross-sectional structure of the thin film transistor 10 In FIG. 3, reference numeral 11 designates a semi-insulating substrate comprising a material such as glass. Reference numeral 12 designates a gate electrode comprising a material such as Cr disposed on the insulating substrate 11. Reference numeral 13 designates a gate insulating layer comprising a material such as SiN or SiO$_2$ disposed on the gate electrode 12. Reference numeral 14 designates a semiconductor layer comprising amorphous silicon, disposed on the gate insulating layer 13. Reference numerals 15 and 16 designate a source electrode and a drain electrode, respectively, comprising Al or Cr disposed on the semiconductor layer 14. Reference numeral 17 designates a protection film comprising an insulating material such as SiN or SiO$_2$ disposed covering the entire surface.

FIG. 5 is a diagram for explaining the operation of the thin film transistor 10 included in the liquid crystal display 1. In FIG. 5, the source electrode 15 is insulated from the liquid crystal material 400 and the drain electrode 16 is in contact with the liquid crystal material 400.

When a constant DC voltage $E_1$ is applied between the source electrode 15 and the drain electrode 16, negative charges in the semiconductor layer 14 flow from the drain electrode 16 to the source electrode 15. Even when a variable gate voltage $E_2$ is applied between the source electrode 15 and the gate electrode 12, the semiconductor layer 14 does not affect the flow of the negative charges so long as this gate voltage $E_2$ is low. When the gate voltage $E_2$ is increased to exceed a threshold voltage $E_t$, the negative charges of the semiconductor layer 14 are pulled toward the gate electrode 12 and, with an increase in the gate voltage $E_2$, the drain current $I_d$ flowing between the gate electrode 12 and the drain electrode 16 rapidly increases and is finally saturated because the charge in the semiconductor layer 14 is constant. The relationship between the drain current $I_d$ flowing between the gate electrode 12, the drain electrode 16, and the gate voltage $E_2$ is as shown in FIG. 12.

Herein, the DC voltage $E_2 + E_3$ which is applied between the transparent electrode 220 which is fixed to the color filter 210 of the front substrate 200 of the liquid crystal display 1 and the gate electrode 12 is essentially applied to the gate insulating layer 13 of the thin film transistor 10 when the gate voltage $E_2$ is low. On the other hand, when the gate voltage $E_2$ is increased above the threshold voltage $E_t$, as described above, the drain current $I_d$ flows between the gate electrode 12 and the drain electrode 16, the apparent resistance between the gate electrode 12 and the drain electrode 16 is lowered, and the DC voltage $E_2 + E_3$ is applied to the liquid crystal material 400 between the transparent electrode 220 and the drain electrode 16. As a result, the molecules of the liquid crystal material 400 are arranged in the direction of the electric field produced by the DC voltage $E_2 + E_3$ and become transparent to the transmitted light or incident light.

Then, when the gate voltage $E_2$ is reduced, an operation reverse to the above-described one is obtained, and the degree of orientation of the molecules of the liquid crystal material 400 is reduced and the liquid crystal material 400 becomes opaque to the transmitted light or incident light. In this way, through the switching function of the plurality of thin film transistors 10 in the liquid crystal display, the display state of the liquid crystal display is controlled.

When, during operation, the gate voltage 14 is altered by static electricity from friction between the rear substrate 10 and the front substrate 200 with the other materials or an external voltage surge is applied between the gate electrode 12 and the source electrode 15 of the thin film transistor 10, positive or negative charges are injected from the semiconductor layer 14 into the gate insulating film 13. These charges are captured by traps in the gate insulating layer 13 in the neighborhood of the interface between the gate insulating film 13 and the semiconductor layer 14, with the result that a space charge is generated in the gate insulating layer 13.

When the voltage produced by the space charge is opposite that of the gate voltage $E_2$ of the thin film transistor 10, the relationship between the drain current $I_d$ and the gate voltage $E_2$ shown in FIG. 12 drifts toward the abnormal state (curve a) which has a higher threshold than normal (curve b). Then, instead of having the highest brightness at the gate voltage $E_0$, a pixel for which the above-described relation between $I_d$ and $E_2$ of the thin film transistor 10 has drifted to the curve a has a low brightness.

On the contrary, when the direction of the voltage produced by the space charge has the same direction as the gate voltage $E_2$ of the thin film transistor 10, the threshold value drifts to the lower side, from the normal threshold voltage $E_b$ (curve b) to the low threshold voltage $E_c$ (curve c). Then, a normal pixel with a thin film transistor receiving a gate voltage $E_0$ and an abnormal pixel in which the $I_d$-$E_2$ relation of the associated thin film transistor 10 has drifted toward the curve c both have the maximum brightness. Even when the brightness of the normal pixel is made darker by lowering the driving voltage from $E_2$ to $E_b$, the abnormal pixel remains bright.

Variations in the threshold voltages of several tens of thousands to several hundreds of thousands of thin film transistors included in a liquid crystal display appear as a line defect or a point defect on the liquid crystal display screen.

In order to suppress the drift of $I_d$-$E_2$ of the thin film transistor 10, as discussed in "Japan Society for the Promotion of Science, Amorphous Material 147th Committee 15th Conference Material, p 12 to p 15 (Feb. 17, 1987)", the composition of the gas mixture, such as the gas ratio of $N_2$ to $NH_3$, while producing the gate insulating layer 13, is stoichiometrically optimized, the production temperature is raised to 300° to 360° C. from the conventional temperature of approximately 200° C. or the threshold voltage drift is made uniform by annealing for 1 to 3 hours at a temperature of 200° to 400° C. after producing the thin film transistor 10. In all the above-described conventional methods, the number of traps in the gate insulating layer 13 is reduced. Other than that, charges captured in the traps at the gate insulating layer 13 may be released by applying thermal energy or optical energy to the thin film transistor 10.

However, when the conventional methods of suppressing the shift of the $I_d$ - $E_2$ relationship of the thin film transistor 10 are utilized, the number of traps at the gate insulating layer 13 of the thin film transistor 10 is reduced, but the traps cannot be completely eliminated. Therefore, when an external electric field is again applied to the thin film transistor 10, there is the possibility that a shift in the $I_d$ - $E_2$ relationship of the thin film transistor will occur.

Furthermore, the liquid crystal display 1 may produce a faulty display due to the static electricity between the rear substrate 100 and the front substrate 200 of the liquid crystal display 1 or an external surge voltage, making it necessary to restore the liquid crystal display 1.

However, because the liquid crystal material of the liquid crystal material 1 is likely to be resolved by heat, high temperature annealing is not used. Furthermore, although it is possible to restore the faulty display by irradiating the thin film transistor 10 corresponding to the pixel showing the faulty display with light, if too much light energy is applied, the liquid crystal material 400 is likely to be resolved or the characteristics of the semiconductor layer 14 are likely to be changed. On the contrary, when the supply of the light energy is insufficient, the restoration of the faulty display is unsatisfactory.

SUMMARY OF THE INVENTION

It is an object of the present invention to provide a precise liquid crystal display restoring apparatus for precisely adjusting the threshold voltage drift of the thin film transistor that controls the display state of the liquid crystal display element.

Other objects and advantages of the present invention will become apparent from the detailed description given hereinafter; it should be understood, however, that the detailed description and specific embodiment are given by way of illustration only, since various changes and modifications within the spirit and scope of the invention will become apparent to those skilled in the art from this detailed description.

A liquid crystal display restoring apparatus according to the present invention includes a signal generator for generating a signal for driving a liquid crystal display, a light irradiation means for irradiating a thin film transistor with light to control the display state of a liquid crystal display element and to correct threshold voltage drift, and an evaluation means for evaluating the display state of the liquid crystal display element and for controlling the amount of light irradiation.

In accordance with the present invention, the display state of the liquid crystal element is evaluated and the amount of light with which the thin film transistor is irradiation is controlled to correct the threshold voltage drift of the thin film transistor and the display of the liquid crystal element is thus restored. Thereby, precise equalization of the threshold voltage of the thin film transistor can be achieved and the picture quality and the production yield of the liquid crystal display can be enhanced.

DETAILED DESCRIPTION OF THE PREFERRED EMBODIMENTS

Figure 1:
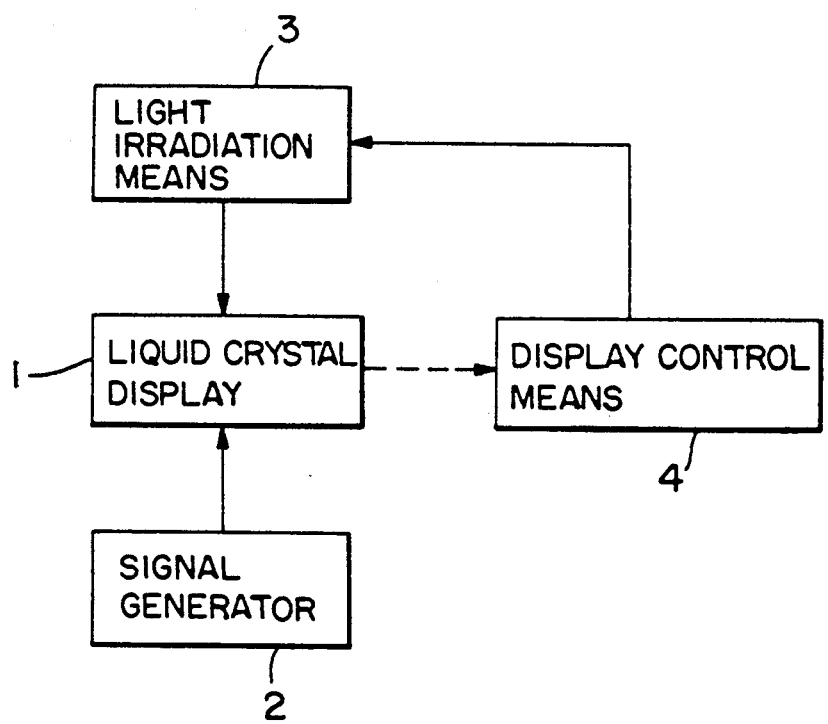
FIG. 1 is a block diagram of a liquid crystal display restoring apparatus according to a first embodiment of the present invention.
Figure 2:
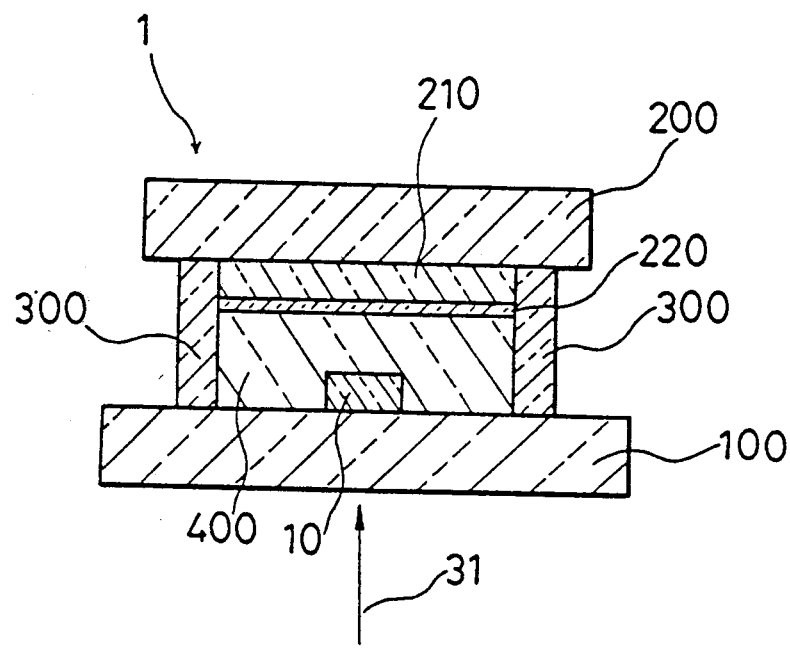
FIG. 2 is a cross-sectional view of a liquid crystal display driven by a thin film transistor.
Figure 3:
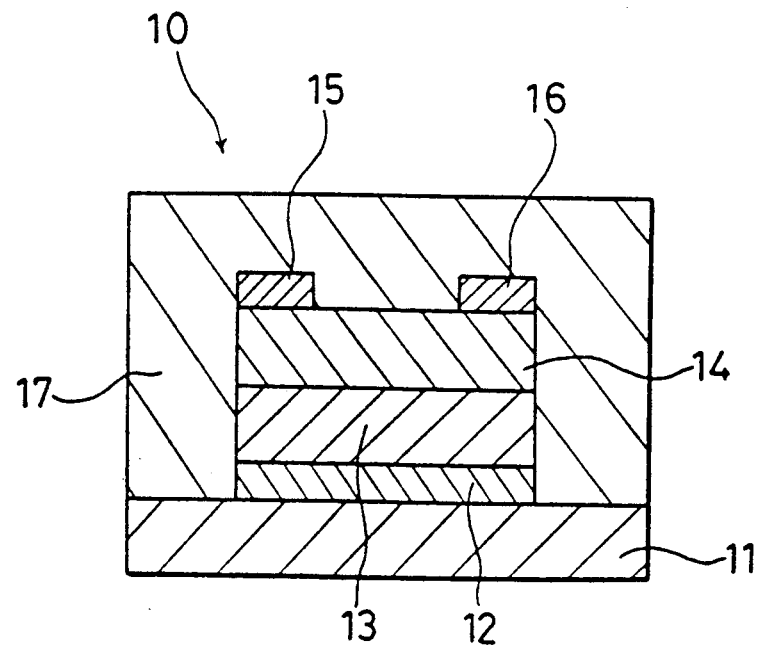
FIG. 3 is a cross-sectional view of the thin film transistor.
Figure 4:
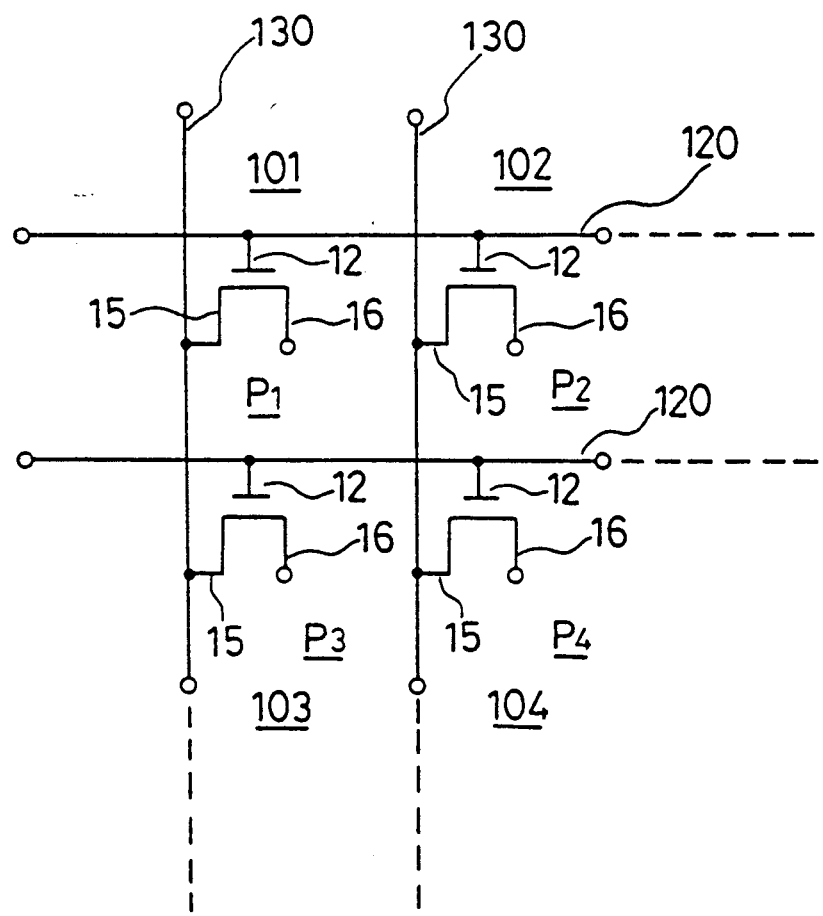
FIG. 4 is an equivalent circuit of the liquid crystal display of FIG. 2.
Figure 5:
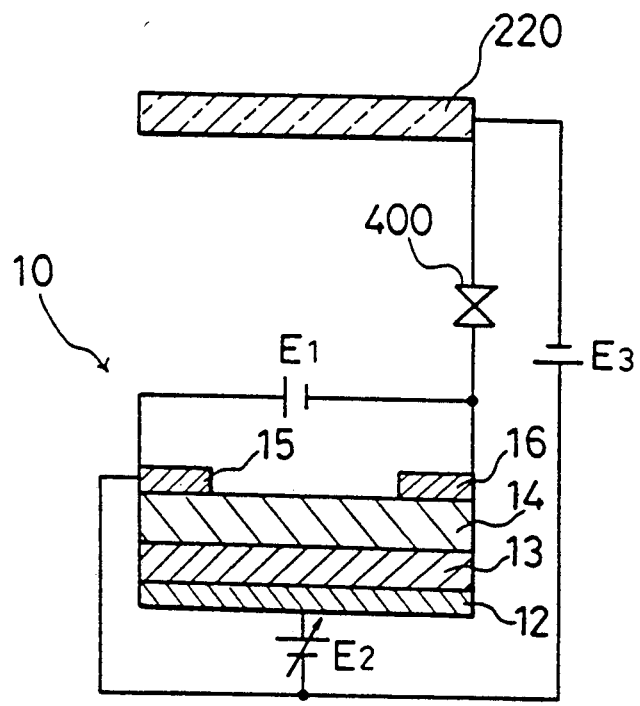
FIG. 5 is a diagram for explaining the operation of the thin film transistor.
Figure 6A:
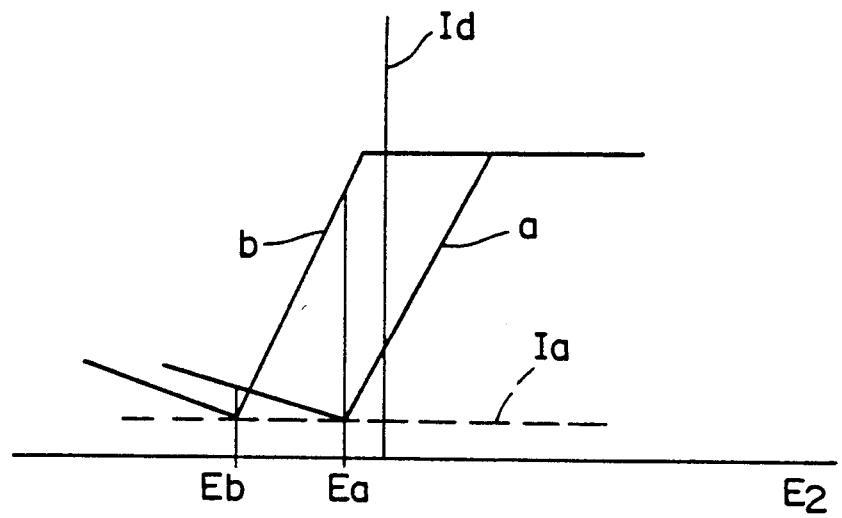
FIGS. 6(a) and 6(b) are diagrams for explaining the operation of the liquid crystal display defect restoring apparatus.

FIG. 1 is a block diagram of a liquid crystal display restoring apparatus according to a first embodiment of the present invention. FIGS. 4 and 6(a) show equivalent circuits of the liquid crystal display and the $I_d$ - $E_2$ characteristics of a thin film transistor for explaining the principle of threshold voltage drift adjustment of the liquid crystal display, respectively.

In these figures, reference numeral 1 designates a liquid crystal display, reference numeral 2 designates a signal generator for generating a driving signal for driving the liquid crystal display 1. Reference numeral 3 designates a light irradiation means for irradiating the thin film transistor 10 with a light beam 31. Reference numeral 4 designates a display control means for evaluating the display state of the liquid crystal display and controlling the quantity of the light beam 31 on the basis of the evaluation. Herein, the thin film transistor 10 is irradiation with the light beam 31 via the rear substrate 100. A YAG, Xe, or Ar laser, the beam diameter of which is collimated to 5 to 100 microns, is preferably used as the source of the light beam 31.

The restoring process when the threshold voltage of the thin film transistor 101 of the pixel $P_1$ has drifted toward a negative direction is described with reference to FIG. 4.

First of all, a picture image is displayed by driving the liquid crystal display using the signal generator 2 and the position of a pixel $P_1$ whose display brightness is low is automatically detected by the display control means 4. The normal brightness of a pixel $P_2$ is stored in a memory circuit (not shown) included in the display control means.

Next, in order to determine the drift amount of the threshold voltage in the $I_d$ - $E_2$ characteristics of the thin film transistor 101 corresponding to the pixel $P_1$, the brightness of the pixel $P_1$ is measured by the display control means 4 and a gate signal $b_1$ is applied to the gate electrode 12 of the thin film transistor 101 of the pixel $P_1$ via the gate line 120 from the signal generator 2. Based on the brightness of the pixel $P_2$ relative to the brightness of the pixel $P_1$, the gate signal $b_1$ is gradually changed in the positive direction.

Figure 6B:
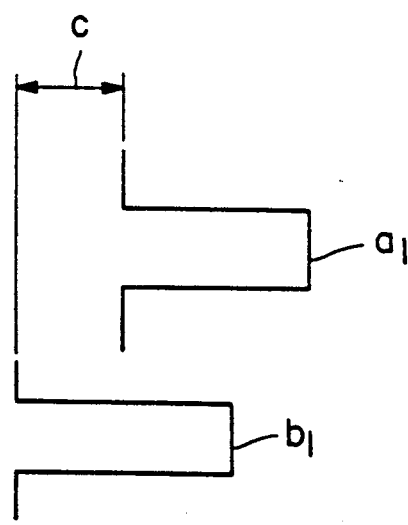

Herein, as is apparent from the $I_d$ - $E_2$ curves (b) and (a) of the thin film transistors 101 and 102 corresponding to pixels $P_1$ and $P_2$ and the $I_d$ - $E_2$ characteristics of FIG. 6(a), when the brightnesses of the pixels $P_1$ and $P_2$ are equal to each other, the difference value C between the gate signals $b_1$ and $a_1$ applied to the respective gate electrodes 12 of the thin film transistors 101 and 102, illustrated in FIG. 6(b) is approximately equal to the difference between the threshold voltages $E_b$ and $E_a$ of the respective thin film transistors 101 and 102, that is, the drift amount of the threshold voltage of the thin film transistor 101.

Thereafter, the irradiation conditions of the light irradiation means 3, such as laser power, byte size, Q switch frequency, and processing pitch in the case of YAG laser are determined from the drift amount $E_a$ - $E_b$ of the threshold voltage of the thin film transistor 101 corresponding to the pixel $P_1$, the laser beam 31 irradiates the thin film transistor 101, and a comparison of the brightnesses of the pixels $P_1$ and $P_2$ is again conducted by the display control means 4. By repeating this procedure, the threshold voltage drift of the thin film transistor 101 can be effectively corrected or made uniform when the liquid crystal display 1 displays an image.

Thereafter, similar processing is carried out for the other defective pixels to adjust the threshold voltage drifts of their respective thin film transistors.

Herein, as an example of the laser conditions, laser power of 0.1 μJ/pulse, byte size of 0.3 micron, a Q switch frequency of 1000 Hz, a laser beam diameter of 6.5 microns, and a processing pitch of 2 microns are suitable when the drift amount of the threshold voltage of the thin film transistor 10 is $-10$ V.

In the above-described embodiment, a signal generator 2 for generating a driving signal of the liquid crystal display 1 and a irradiating means 3 for generating a laser beam 31 are provided, the display state of the liquid crystal display 1 is evaluated, and a threshold correction is made by laser beam irradiation of each defective thin film transistor 101 and for all other defective thin film transistors (not shown) on the basis of the evaluation result, thereby to make uniform the threshold voltages of the thin film transistors. Therefore, the threshold voltages of the plurality of thin film transistors included in the liquid crystal display are independently and precisely made uniform. Thus, dark dots or lines in a liquid crystal display are eliminated and the picture quality of the display and product yield greatly enhanced.

In the above-illustrated embodiment, the light beam 31 irradiates the liquid crystal display when the liquid crystal is sealed between the rear substrate 100 and the front substrate 200. However, the restoring technique of the present invention can also be applied by irradiating the rear substrate 100 on which only thin film transistors are arranged. In that case, correction of the threshold voltage drift is achieved by irradiating the thin film transistor 10 opposite to or through the rear substrate 100. In this case, by adjusting the threshold voltage drift of the thin film transistor 10 when the rear substrate 100 is preheated to a predetermined temperature, it is possible to shorten the restoring time.

Figure 10:
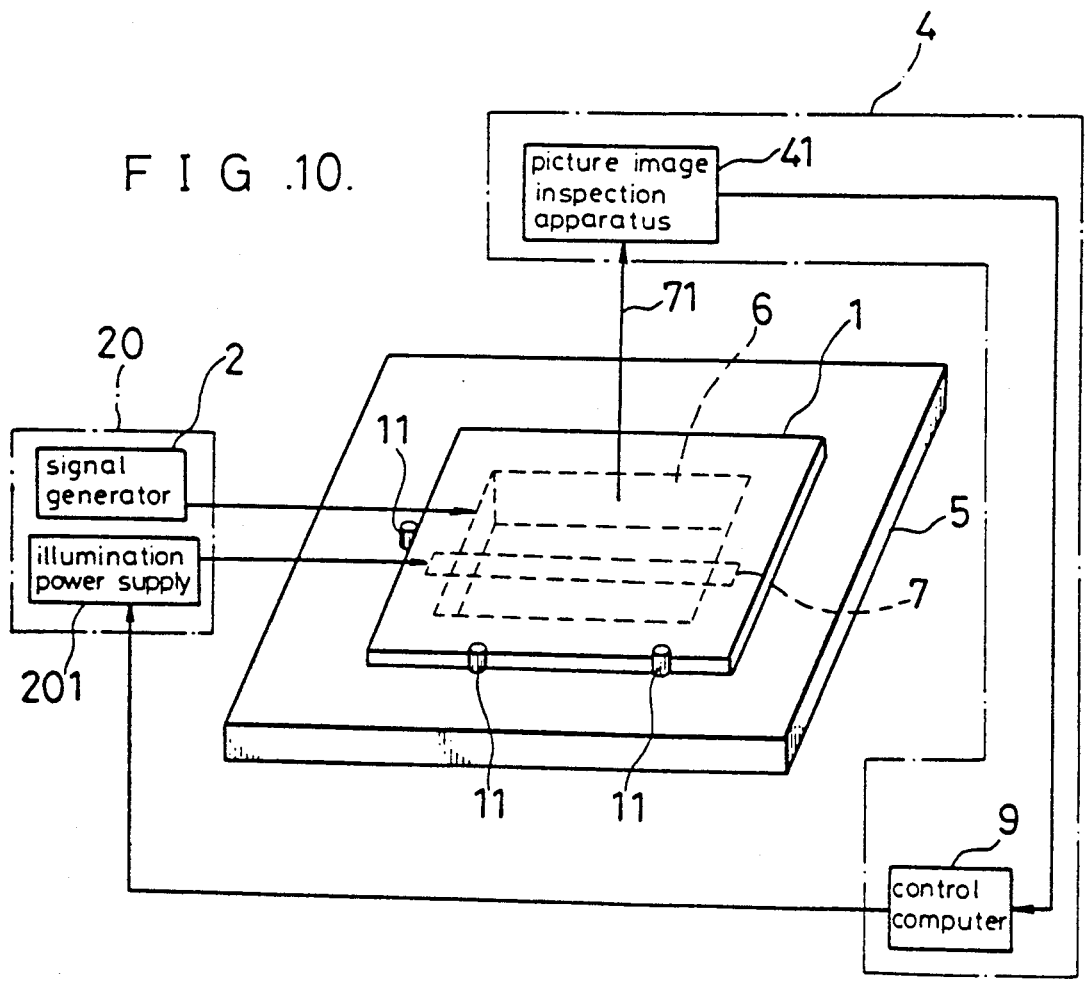
Figure 11:
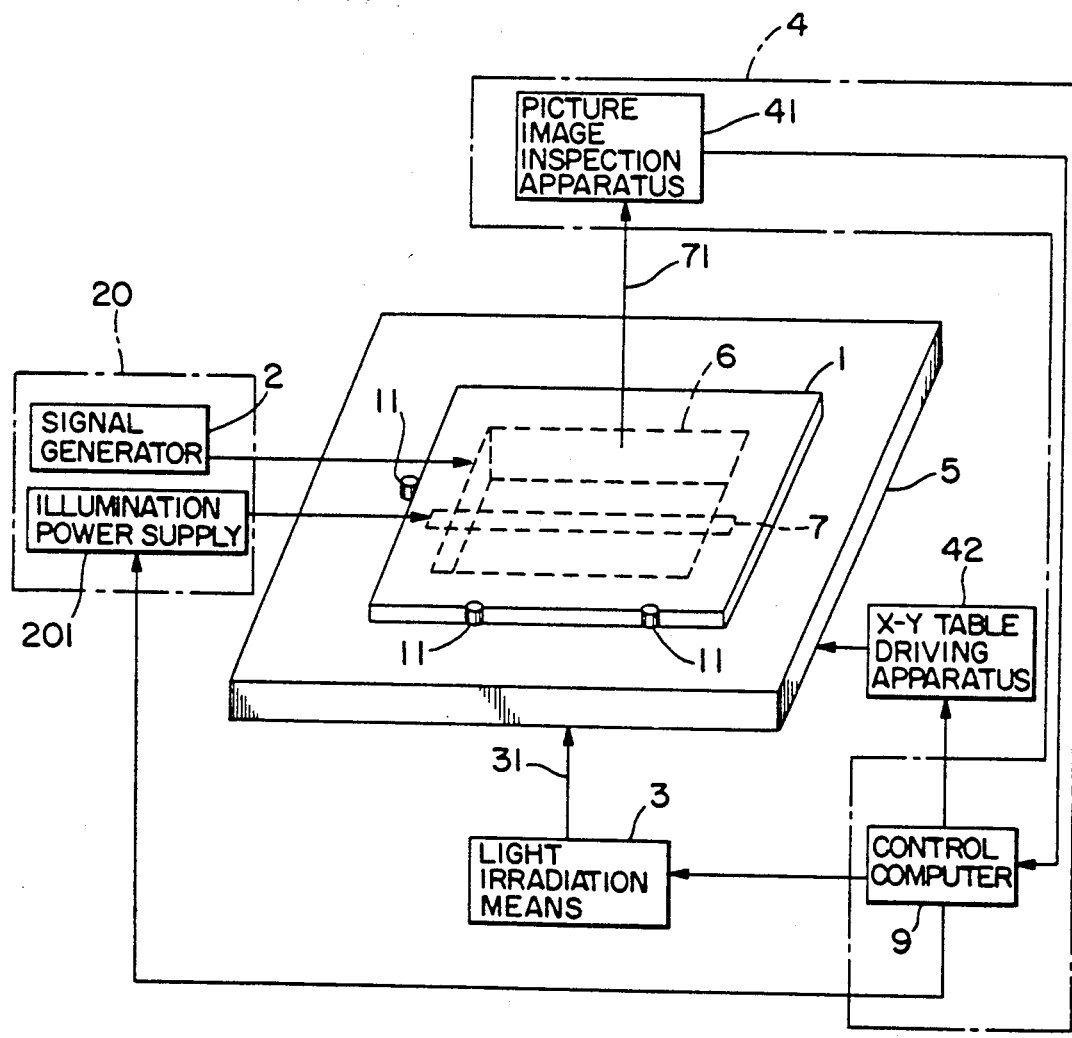
FIG. 11 is a schematic diagram of a liquid crystal display restoring apparatus.
Figure 12:
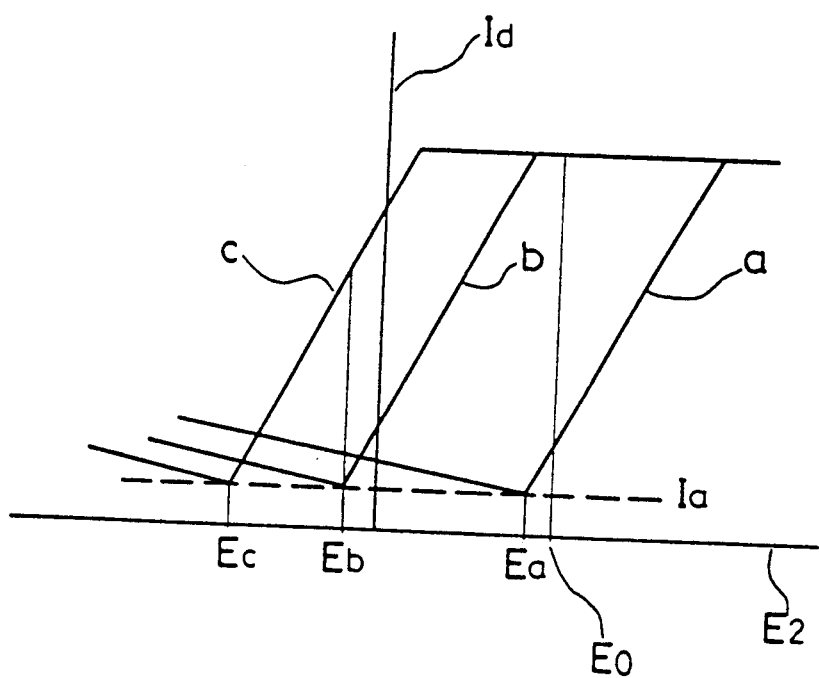
FIG. 12 is a diagram for explaining threshold drift of a thin film transistor.

FIG. 11 is a diagram showing a liquid crystal display restoring apparatus according to another embodiment of the present invention. FIGS. 7 to 10 illustrate successive steps of the restoration process.

In FIG. 11, reference numeral 1 designates a liquid crystal display fixed on the X-Y table 5. Reference numeral 20 designates a driving power supply including a signal generator 2 for generating a signal for driving the liquid crystal display 1 and an illumination power supply 201 for the illumination light source 7 for projecting light which illuminates the display screen of the liquid crystal display 1. Reference number 3 designates a light irradiation means for irradiating the gate insulating layer 13 with light beam 31 through the rear substrate 100 of the thin film transistor 10. Reference numeral 4 designates a display control means including a picture image inspection apparatus 41 for detecting the position of a liquid crystal display element which is faulty in its display brightness. Inspection apparatus 41 measures the display brightness of each liquid crystal display element by receiving the light signal 71 which is output from the liquid crystal display 1. The display control means also includes a control computer 9 for controlling the amount of the light irradiation by the light irradiation means 3 on the basis of a comparison between the brightness of the faulty liquid crystal display element and a reference value. Reference numeral 42 designates an X-Y table driving apparatus for driving the X-Y table 5 that can change the relative position between the liquid crystal display 1 and the light irradiation means 3.

Figure 7:
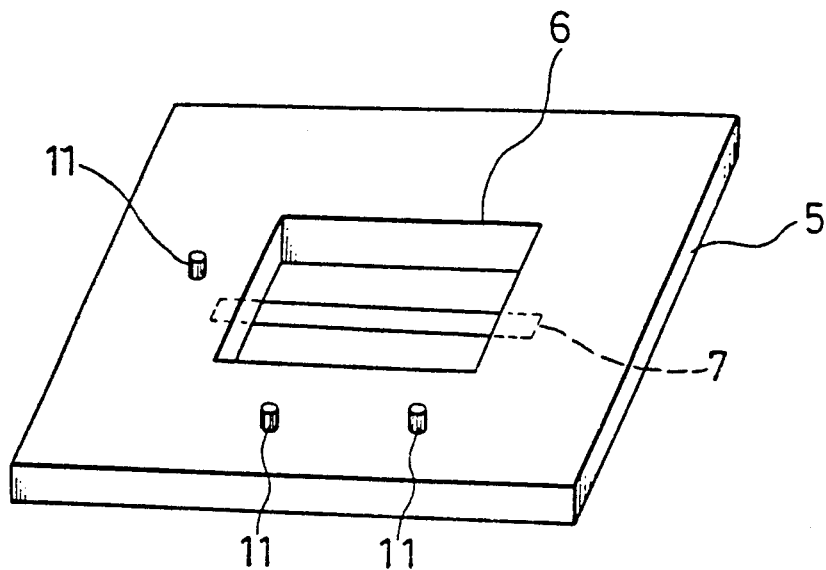
FIGS. 7 to 10 are schematic diagrams for explaining a liquid crystal display restoring apparatus according to another embodiment of the present invention.

The X-Y table 5 has a central opening 6 and three guide pins 11 at the periphery thereof and is provided with an illumination light source 7 at the rear surface thereof, as shown in FIG. 7.

Figure 8:
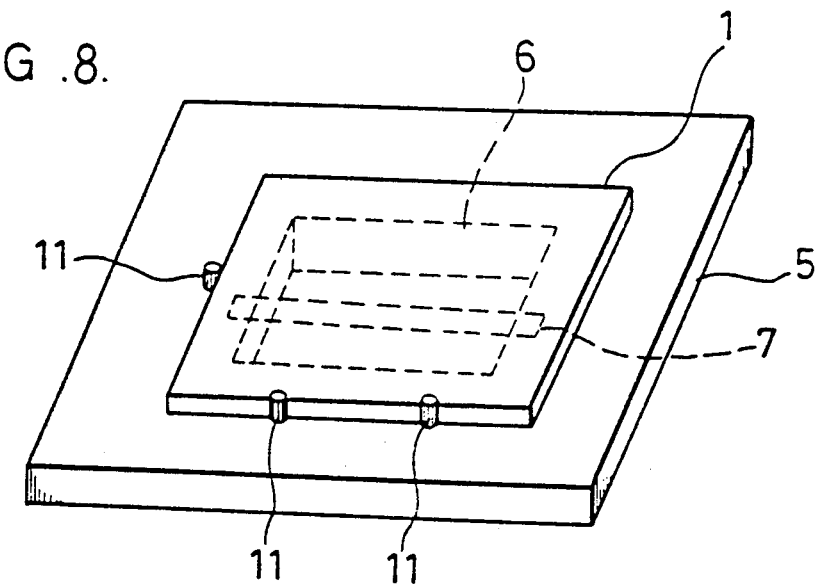

First of all, as shown in FIG. 8, the liquid crystal display 1 is mounted on the X-Y table 5, and it is fixed along with the three guide pins 11. The liquid crystal display 1 is disposed such that its display screen faces an opening 6 in the X-Y table 5. Since the gate line 120 and the drain line 130 of the display lie in a longitudinal and a transverse direction on the display screen of the liquid crystal display 1, the optical axis of the irradiation light beam 31 is positioned at the center of the thin film transistor 10 corresponding to the pixel at the center of the liquid crystal display 1.

Figure 9:
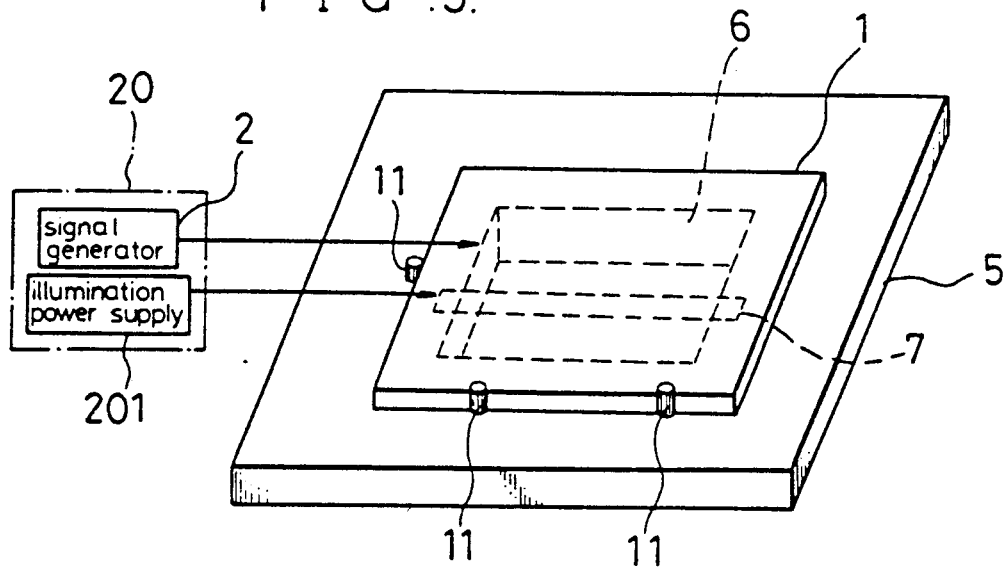

As shown in FIG. 9, the illumination light source 7 is turned on by the illumination power supply 201, and the driving signal from the signal generator 2 to the liquid crystal display 1 is successively increased in its level, within a predetermined range, for application to the liquid crystal display 1. The degree of orientation of the molecules of the liquid crystal material 400 increases with the increase of the driving signal of the liquid crystal display 1 and, as light from the illumination light source 7 is transmitted, the display screen of the liquid crystal display 1 gradually changes to bright from dark.

Next, as shown in FIG. 10, the display brightness of each element of the liquid crystal display 1 is measured by the picture image inspection apparatus 41 and is stored in the control computer 9 with a normal brightness as a reference value. Thereafter, a liquid crystal display element having a low brightness or a high brightness relative to the reference value is detected by the picture image inspection apparatus 41. The addresses in the plurality of rectangular sections on the display screen of the liquid crystal display 1 are recognized and stored in the control computer 9. The X-Y driving apparatus 42 is driven by the signal from the control computer 9 so that the optical axis of the light beam 31 is made coincident with the thin film transistor 10 corresponding to the address of a faulty element by the movement of the X-Y table 5.

When the brightness of the faulty display element is low relative to the reference value (brightness of the normal display element), and the driving signal level sent out to the liquid crystal display 1 from the signal generator 2 is lowered. Once the brightness of the faulty display element becomes dark, the signal level is kept constant. Furthermore, when the brightness of the faulty display element is high relative to the reference value (brightness of the display normal element), the driving signal sent out to the liquid crystal display 1 from the signal generator 2 is lowered. Once the display brightness of the normal display element has become dark, the driving signal level is kept constant.

By the above-described display control means, the brightness difference between the normal display elements and the faulty display elements when the driving signal level of the liquid crystal display 1 is kept constant is obtained. The light beam irradiation is determined on the basis of the brightness difference and light beam 31 irradiates the thin film transistor 10 corresponding to a faulty display element. Comparison of the brightness of the normal display element and the faulty display element is again carried out by the display control means. By repeating such procedures, the threshold voltage drift of the thin film transistor 10 is effectively corrected or made uniform when the liquid crystal display 1 is operated.

Thereafter, the same process is carried out for the other faulty display elements to correct threshold voltage drift.

In this embodiment, the display state of the liquid crystal display elements are detected, the threshold of a faulty liquid crystal display element and the reference value are compared, and light irradiation is controlled on the basis of the comparison. Therefore, threshold value adjustment processing can be carried out for each display element continuously. Thus, defect correction time is shortened.

As is evident from the foregoing description, according to the present invention, the display state of a liquid crystal display element is evaluated and light irradiation based on the evaluation is applied to the thin film transistor to adjust the drift of the threshold voltage. Therefore, the threshold voltage of the thin film transistor which is included in the liquid crystal display can be precisely made uniform and the quality and yield of the liquid crystal display can be greatly increased.

What is claimed:

1. An apparatus for adjusting threshold voltages of thin film transistors in a liquid crystal display including a plurality of liquid crystal display elements, each element having a corresponding thin film transistor, comprising:

display driving means for driving a liquid crystal display element, the element including a thin film transistor having a threshold voltage and controlling the brightness of the element;

a picture element inspection apparatus for comparing the brightness of said liquid crystal display element relative to a reference brightness; and threshold voltage adjusting means including a light source for adjusting the threshold voltage of said thin film transistor when the brightness of the corresponding display element differs from the reference brightness by irradiating the thin film transistor with a quantity of light from said light source in response to the brightness comparison by said picture element inspection apparatus.

2. An apparatus as defined in claim 1 wherein said liquid crystal display element comprises a rear substrate on which said thin film transistor is disposed, a transparent front substrate, a color filter disposed between said front and rear substrates and adjacent said front substrate, a transparent electrode mounted on said color filter opposite said front substrate, a seal disposed between said front and rear substrates enclosing a volume between said front and rear surfaces in which said thin film transistor, color filter, transparent electrode, and a liquid crystal material are disposed.

3. An apparatus as defined in claim 1 wherein said light source is one of a YAG, Xe, and Ar laser.

4. An apparatus for adjusting threshold voltage drift of a thin film transistor in a liquid crystal display including a liquid crystal display element having a thin film transistor for controlling the brightness of the element comprising:

a liquid crystal display driving apparatus for driving a liquid crystal display element, the element including a thin film transistor having a threshold voltage and controlling the brightness of the element;

light irradiation means for varying the threshold voltage of said thin film transistor by irradiating said thin film transistor with a light beam; and evaluating and controlling means for comparing the brightness of said liquid crystal display element to a reference brightness and for controlling the amount of irradiation of the thin film transistor in response to the comparison.

5. An apparatus as defined in claim 4 wherein said liquid crystal display element comprises a rear substrate on which said thin film transistor is disposed, a transparent front substrate, a color filter disposed between said front and rear substrates and adjacent said front substrate, a transparent electrode mounted on said color filter opposite said front substrate, a seal disposed between said front and rear substrates enclosing a volume between said front and rear surfaces in which said thin film transistor, color filter, transparent electrode, and a liquid crystal material are disposed.

6. An apparatus as defined in claim 4 wherein said light irradiation means comprises one of a YAG, Xe, and Ar laser.

7. An apparatus for adjusting threshold voltages of thin film transistors in a liquid crystal display including a plurality of liquid crystal display elements, each element having a thin film transistor for controlling the brightness of the element, comprising:

a movable mounting plate having first and second surfaces for supporting on the first surface a liquid crystal display including a plurality of display elements, each element including a thin film transistor having a threshold voltage and controlling the brightness of the respective element;

display driving means for driving the respective display elements of said liquid crystal display;

light irradiation means for varying the threshold voltage of respective thin film transistors by irradiating said respective thin film transistor with a light beam;

brightness detecting means for detecting the brightness of respective liquid crystal display elements;

display control means for comparing the brightness of a liquid crystal display element with a reference brightness and for controlling the amount of irradiation by the light beam in response to the comparison to adjust the threshold voltage of a thin film transistor of the corresponding display element; and a position adjusting means for adjusting the position of said liquid crystal display relative to said light beam by moving said mounting plate.

8. An apparatus as defined in claim 7 wherein said liquid crystal display element comprises a rear substrate on which said thin film transistor is disposed, a transparent front substrate, a color filter disposed between said front and rear substrates and adjacent said front substrate, a transparent electrode mounted on said color filter opposite said front substrate, a seal disposed between said front and rear substrates enclosing a volume between said front and rear surfaces in which said thin film transistor, color filter, transparent electrode, and a liquid crystal material are disposed.

9. An apparatus as defined in claim 7 wherein said movable mounting plate comprises an X-Y table and including light irradiation means for illuminating said liquid crystal display from the second surface of said movable mounting plate and an power supply for supplying power to said illumination light irradiation means.

10. An apparatus as defined in claim 7 wherein said light irradiation means comprises is one of a YAG, Xe, and Ar laser.

* * * * *